(12) United States Patent
Polasek et al.

(10) Patent No.: US 11,858,374 B1
(45) Date of Patent: Jan. 2, 2024

(54) VEHICULAR MOTION ENERGY TRANSFER SYSTEM

(71) Applicants: John Tyler Polasek, Pearland, TX (US); John Joel Polasek, Pearland, TX (US); Steven Thomas Polasek, Pearland, TX (US); Matthew Theodore Polasek, Pearland, TX (US)

(72) Inventors: John Tyler Polasek, Pearland, TX (US); John Joel Polasek, Pearland, TX (US); Steven Thomas Polasek, Pearland, TX (US); Matthew Theodore Polasek, Pearland, TX (US)

( * ) Notice: Subject to any disclaimer, the term of this patent is extended or adjusted under 35 U.S.C. 154(b) by 251 days.

(21) Appl. No.: 17/170,797

(22) Filed: Feb. 8, 2021

Related U.S. Application Data

(60) Provisional application No. 62/971,765, filed on Feb. 7, 2020.

(51) Int. Cl.
*B60L 55/00* (2019.01)
*F03D 9/32* (2016.01)
*F03D 9/11* (2016.01)
*H02J 4/00* (2006.01)
*G06Q 30/0201* (2023.01)
*G06Q 50/06* (2012.01)

(52) U.S. Cl.
CPC ............... *B60L 55/00* (2019.02); *F03D 9/11* (2016.05); *F03D 9/32* (2016.05); *G06Q 30/0206* (2013.01); *G06Q 50/06* (2013.01); *H02J 4/00* (2013.01); *F05B 2220/706* (2013.01); *F05B 2240/941* (2013.01); *Y02E 10/72* (2013.01); *Y02T 10/7072* (2013.01)

(58) Field of Classification Search
CPC ... B60L 55/00; F03D 9/11; F03D 9/32; G06Q 30/0206; G06Q 50/06; H02J 4/00; F05B 2220/706; F05B 2240/941
See application file for complete search history.

(56) References Cited

U.S. PATENT DOCUMENTS

| | | | | |
|---|---|---|---|---|
| 7,492,053 B2* | 2/2009 | Fein | ........................ | F03D 9/25 290/55 |
| 2010/0051370 A1* | 3/2010 | Li | ........................... | F03D 9/32 180/165 |
| 2021/0402885 A1* | 12/2021 | Boyd | .................. | H02J 7/00032 |

* cited by examiner

*Primary Examiner* — Michael C Zarroli
(74) *Attorney, Agent, or Firm* — G. Michael Roebuck, PC

(57) ABSTRACT

A system and method for capturing and redistributing energy captured from vehicular motion.

7 Claims, 9 Drawing Sheets

Software Design Components

- Wireless Antenna / Modem To Send Required Data Packs
- Ability To Receive Digital Inputs For (Partial List)
    o Price
    o Volume
    o Weight
    o Locking Into Bracket Appropriately
    o ID Of Battery
    o ID Of Seller / Buyer Of Energy
- User Friendly Interface
- Ability To Get Info To Bank Accounts
- Ability To Get Info To Accounting Systems
- Ability To Get Info To Vehicle / End Users/ Safety System And Controls

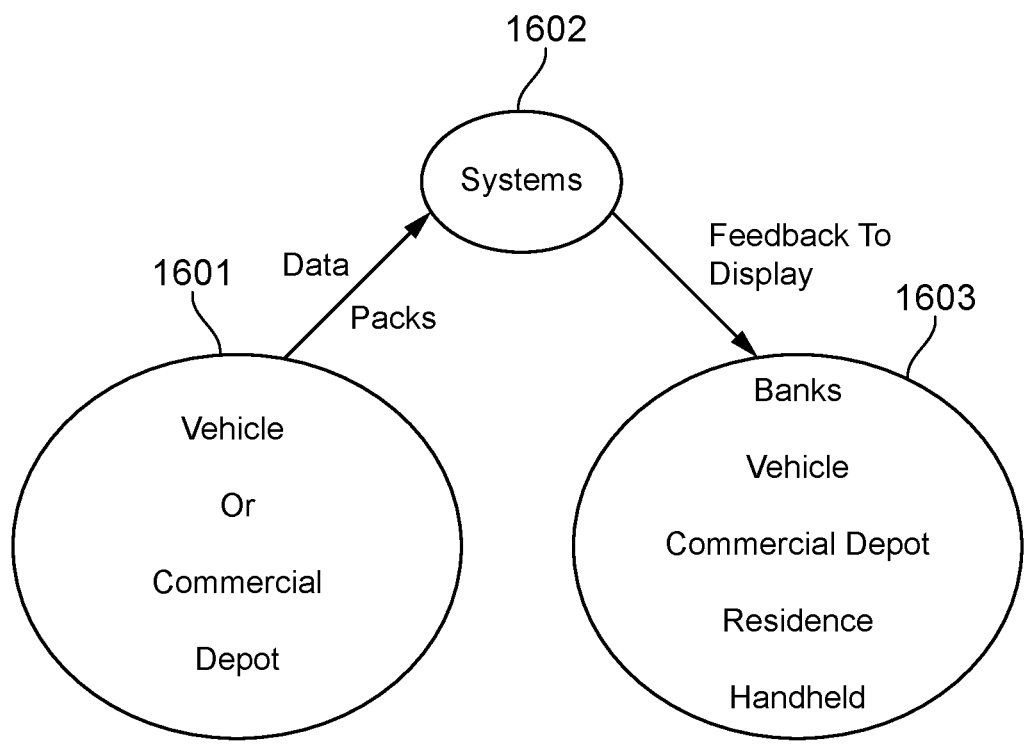

FIG. 16

VEHICULAR MOTION ENERGY TRANSFER SYSTEM

CROSS REFERENCE TO RELATED APPLICATIONS

This patent application claims priority from U.S. provisional patent application Ser. No. 62/971,765 filed on Feb. 7, 2020 by John Polasek and entitled Vehicular Motion Energy Transfer System, which is hereby incorporated by reference herein in its entirety.

BACKGROUND OF THE INVENTION

There is a need for more efficient energy capture and distribution to fuel the world's energy needs.

FIELDS OF THE INVENTION

The fields of utilization for this invention are global and shall cover ground transportation, shipping, and aeronautics (traditional flight and space craft).

SUMMARY OF THE INVENTION

A system and method for capturing and redistributing energy captured from vehicular motion is disclosed.

BRIEF DESCRIPTION OF THE DRAWINGS

FIG. 16 is a data flow diagram of a particular illustrative embodiment of the invention showing software design components.

DETAILED DESCRIPTION OF AN ILLUSTRATIVE EMBODIMENT OF THE INVENTION

Figure 1:
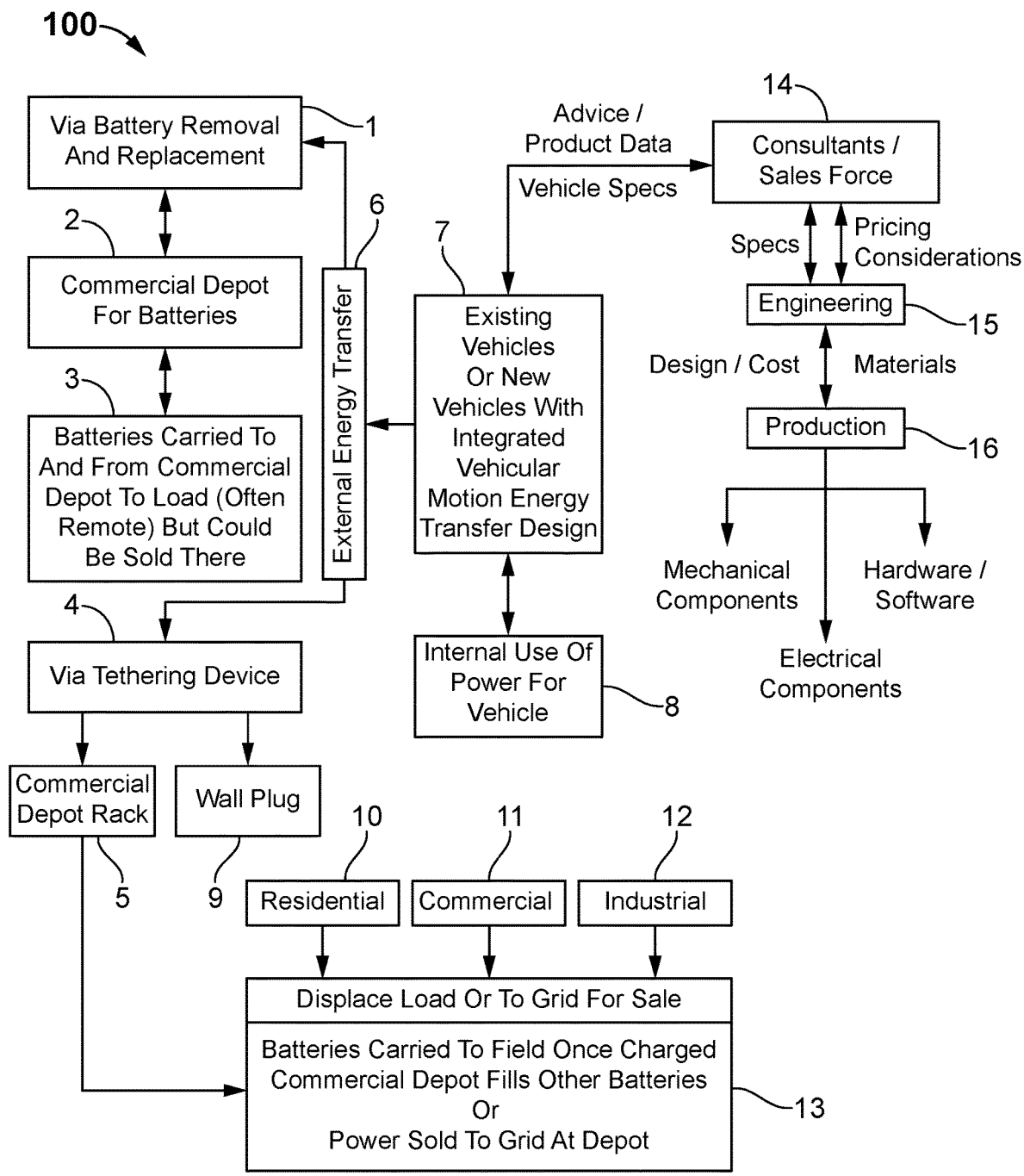
FIG. 1 is a flowchart depiction of a particular illustrative embodiment of the invention showing a value chain for vehicular motion to power energy.

This invention targets capturing and transferring energy from the use of vehicular motion (supplemented by passive forms of energy capture such as solar energy transfer through panels) to energy cells (i.e. batteries uniquely designed for size, weight, and efficiency of transfer to a final market) for storage. The energy capture method is envisioned to be used on essentially every moving vehicle (on road, off road, on water, on rail lines, in air and even potentially in space) that through its motion generates perpetual wind energy. The underlying vehicle may only run on hydrocarbons, electricity, alternative fuel (like hydrogen) or all. The idea widely diverges from the current efforts of most inventors to send electric energy to vehicles batteries to perpetuate their own motion (e.g. Tesla, BMW, Panasonic, etc.). The concept here is to capture the energy from air pushed over and around the vehicle from its motion to charge a storage vessel (i.e. energy cells) for potential use for the vehicle's electric needs; BUT more importantly (i) for storage and ultimately transfer to commercial depots, (ii) to displace load from power distribution markets through a transfer hack into the power grid, (iii) for supplemental or even complete replacement power for residences, commercial, and industrial facilities, and (iv) ultimately to serve remote locations such as off grid applications and to bring energy to remote world locations for basic needs like water wells in poor countries.

A series of mechanical and electronic inventions to fill out the value chain shall be described here to generate and capture the electric energy, in addition to a method for transferring such energy to a wide range of markets. The size and type of components used will be built from the most advanced materials available to efficiently capture the energy through lightweight but strong, aerodynamic, and weather resistant devices. Energy cells shall be optimized in size, weight, and shape to efficiently fit into or on the shell of vehicles to promote aerodynamic efficiency but also to maximize the energy to weight and aerodynamic drag ratio. In addition, measurement and transfer mechanisms will be designed to account for the quantity of energy captured and allow a market transaction to occur for a secondary sale of such captured energy. Software will be created to help markets find depots, gauge compatibility of energy transfers, and to assess value propositions to dispense energy or not depending on market prices. Energy cells shall be designed for various forms of tethering and transfer of energy from energy cell to destination market. Finally, some energy cells shall be designed for quick and efficient complete removal from a vehicle and for replacement back on to such vehicles.

It is envisioned that in countries with first tier energy systems we will find these inventions to be helpful in the capture of power and dispensing it back into the grid for profit as the rate plans of various utilities allow for load to be backed off or supplemental power supplied back to the grid (e.g. currently done with solar panels on a home in some regions). Alternatively, even in such advanced markets remote applications can be served more efficiently by providing energy cell mobility that can be left or transferred to remote depot locations that are served by vehicles coming to them in adequate frequency to make the use of such mobile energy cell units superior to stationary passive systems such as solar or wind turbines on site which are local resource dependent.

In poorer countries, with much of the energy needs being off traditional power distribution grids, it is planned that the full capture to dispensing method of energy through the vehicular motion energy to energy cells will be utilized to help such locations get the required energy for refrigeration of perishable goods, to run water wells, lighting, and generate ambient temperature improvement through air heating and cooling technologies.

The concept contains numerous mechanical and electrical components to tie into existing technologies. All are to be built taking into consideration their shape and materials that allow for maximizing the energy to weight and aerodynamic drag ratio; relative to the amount and rate of energy transfer needed, affordability for the customer, and longevity of the asset's materials for desired term of service. While it is anticipated the energy capture frequently will be in the form of electricity and storage will occur energy cells for power (i.e. batteries), in some instances capturing compressed air in a tank or series of valves and tanks may prove to be the most efficient energy cell to allow the captured wind energy to be transferred to market.

Turning now to FIG. 1, FIG. 1 is a flowchart depiction of a particular illustrative embodiment 100 of the invention showing a drawing of a value chain for vehicular motion to power energy. As shown in FIG. 1, at block 1, batteries are obtained Via Battery Removal and Replacement at block 2 via commercial depot for batteries and at block 3 from batteries carried to and from commercial depot to load (often remote) but could be sold there. Energy transfer 6 is accomplished via tethering device 4. The energy is transferred to a commercial depot rack 5 or wall plug 9. Residential 10, commercial 11 and industrial 12 are connected 13 to displace load or to grid for sale. Batteries are carried to field once charged. Commercial depot fills other batteries or power sold to grid at depot. Consultants/sales force 14 exchange specifications and pricing considerations with engineering 15. Engineering exchange design/cost and materials data with production 16 who outputs data specifying mechanical components, electrical components, and hardware/software.

Figure 2:
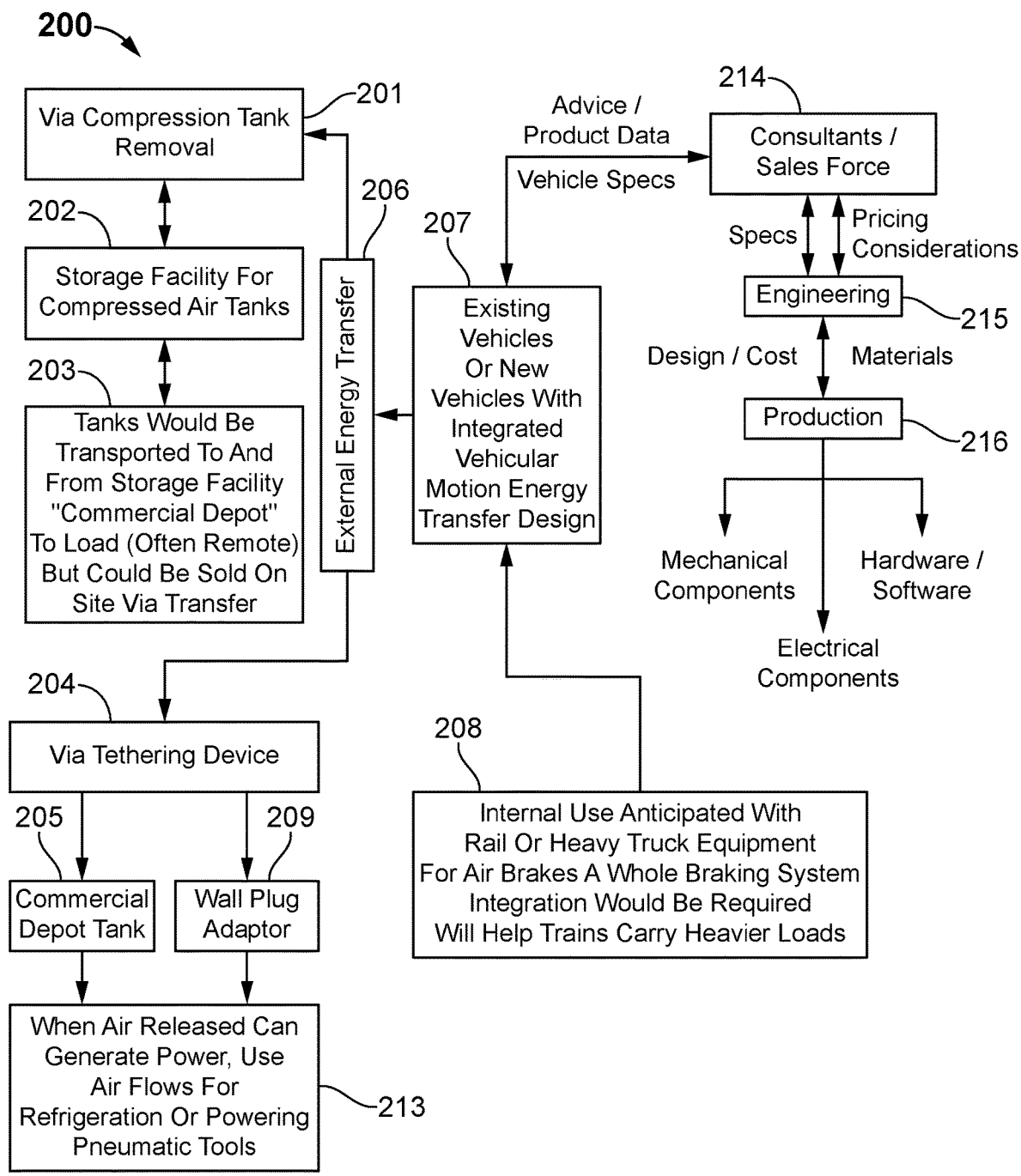
FIG. 2 is a flowchart depiction of a particular illustrative embodiment of the invention showing a value chain for vehicular motion to compressed air energy.

FIG. 2 is a flowchart depiction of a particular illustrative embodiment of the invention 200 showing a drawing of the anticipated value chain for vehicular motion to compressed air energy. As shown in FIG. 2, at block 201 compressed air is obtained compression tank removal at block 202 via storage facility for compressed air tanks, and at block 203 from compressed air tanks transported to and from storage facility commercial depot to load (often remote) but could be sold in site via transfer. External energy transfer 206 is accomplished via tethering device 204. The is transferred to a commercial depot rack 205 or wall plug adapter 209. Batteries are carried to field once charged. Existing vehicles or new vehicles with integrated vehicular motion energy transfer design 207 and exchange advice/production data and vehicle specification with consultants/sales force 214. At 208 internal use anticipated with rail or heavy truck equipment for air brakes a whole braking system integration would be required with trajns that carry heavier loads. Consultants/sales force 214 exchange specifications and pricing considerations with engineering 215. Engineering exchange design/cost and materials data with production 216 who outputs data specifying mechanical components, electrical components, and hardware/software.

Figure 3:
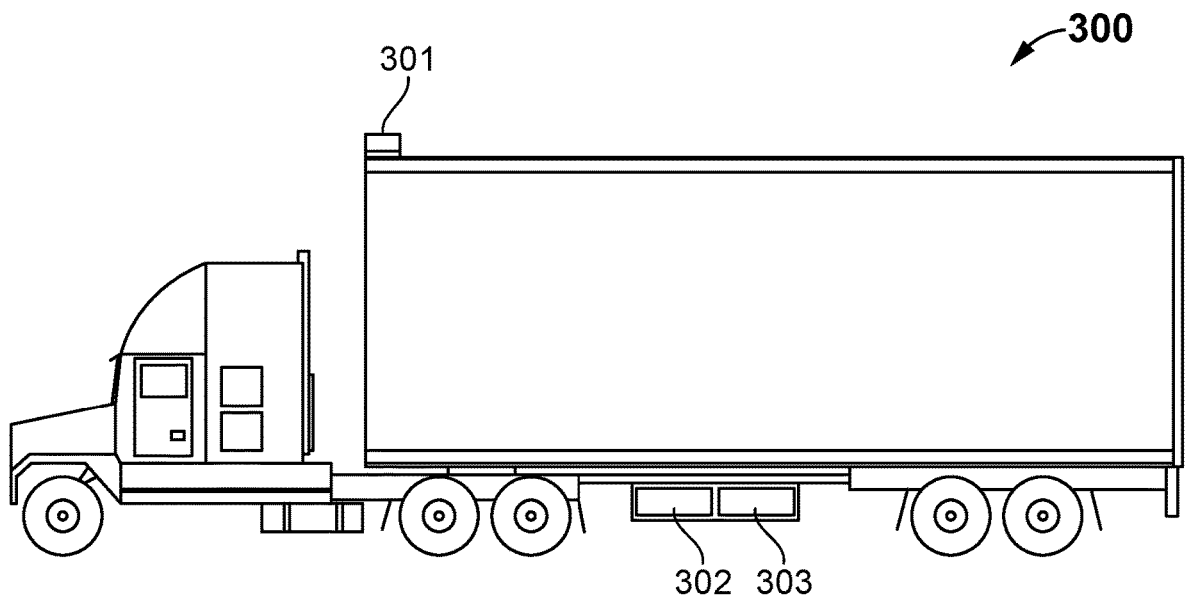
FIG. 3 is a side view depiction of a particular illustrative embodiment of the invention showing an air scoop.

FIG. 3 is a side view depictions of a particular illustrative embodiment of the invention 300 showing an air duct 301, 302 and 303 mounted on an 18-wheeler at various locations. Air scoops are mounted anywhere on a vehicle.

Figure 4:
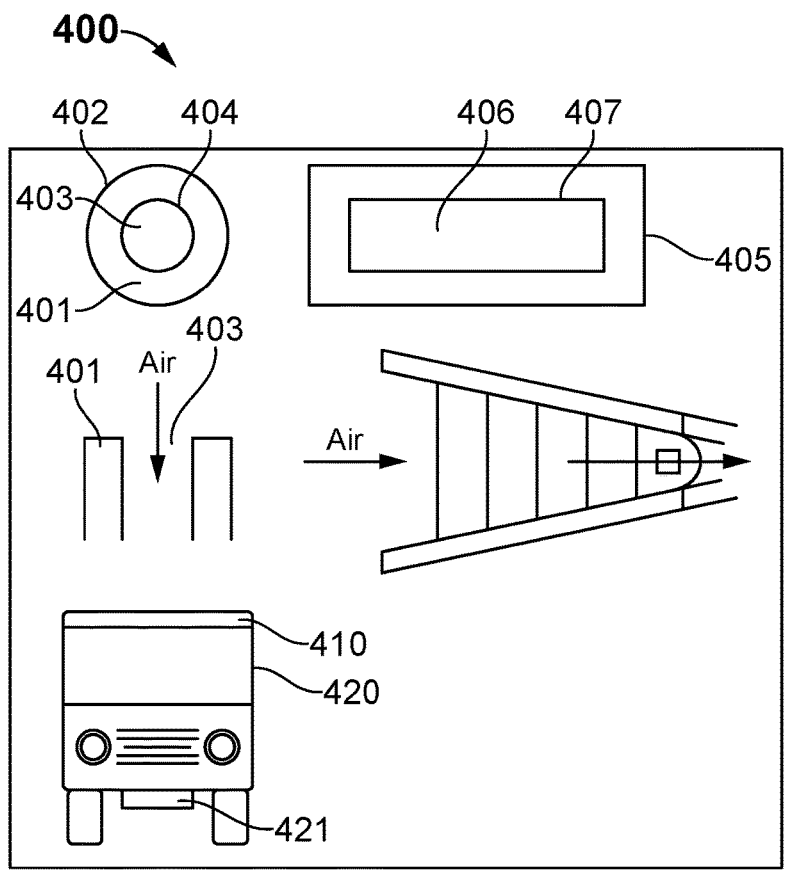
FIG. 4 is a side view depiction of a particular illustrative embodiment of the invention showing an air scoop.

Turning now to FIG. 4, a cross sectional view of an air duct 401 is depicted as an annulus having an interior hollow area 403 formed between an exterior surface 402 and interior surface 404 for air flow. A front view of an air scoop 405 a side view of air scoop 405 are depicted. Two examples are shown in the particular illustrative embodiment 400 of FIG. 4.

Figure 5:
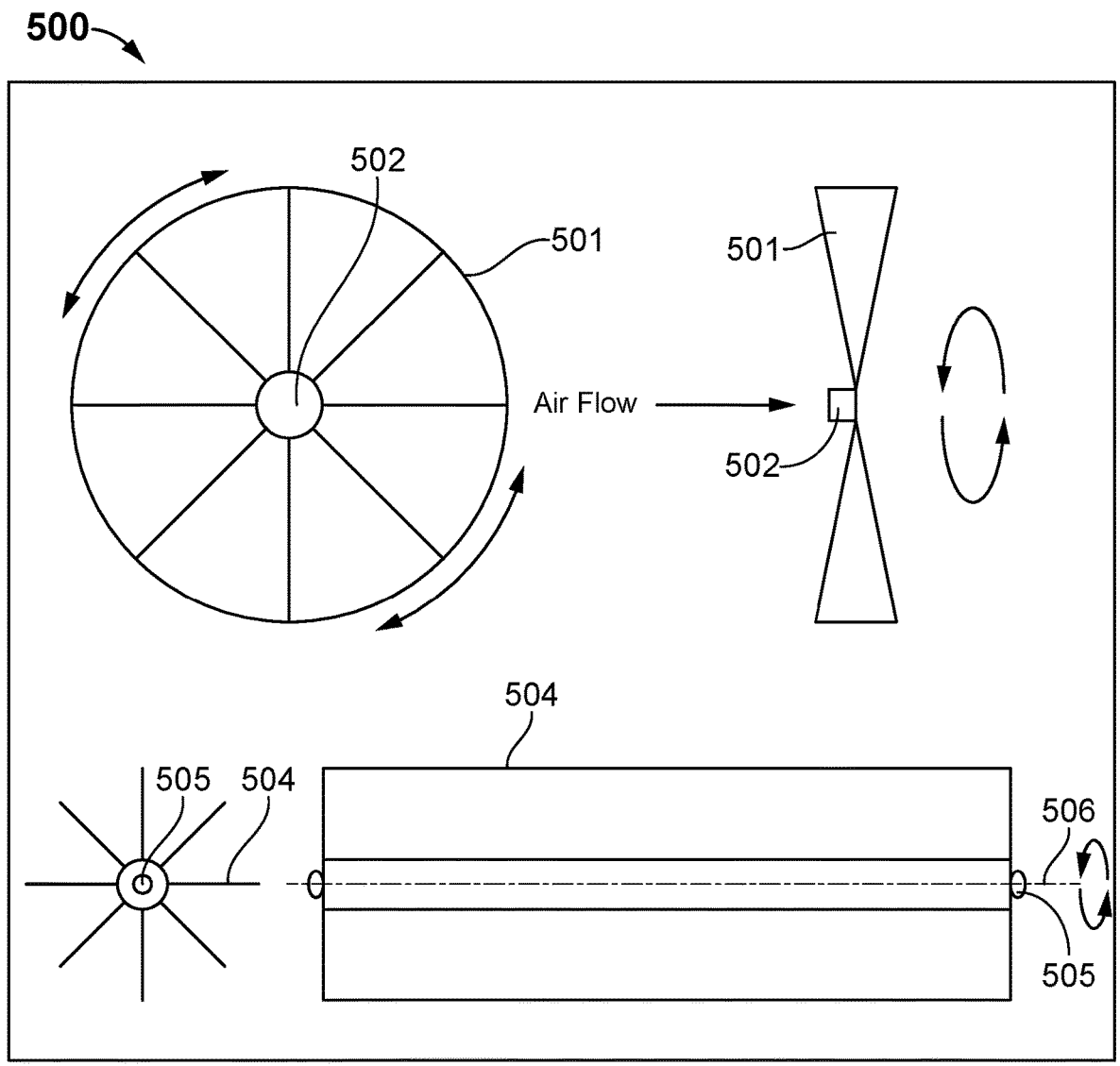
FIG. 5 is a side view depiction of a particular illustrative embodiment of the invention showing an energy converter spine.

Turning now to FIG. 5, as shown in FIG. 5, a front and side view of a particular illustrative embodiment 500 of the invention an energy converter spine having curved blades 501 attached at a center 502 is provided wherein the air flow causes the energy converter spine to rotate. The curved blades and number are optimized. In another particular illustrative embodiment of the invention a spindle is provided shown in a front and side view showing air flow of curved blades 504 attached to spindle center 505 having a spindle axis 506 wherein the air flow causes the spindle to rotate. Generator power is designed to match air flow, gearing and battery absorption rate. The generator is light and durable preferably having an armature and coil design.

Figure 6:
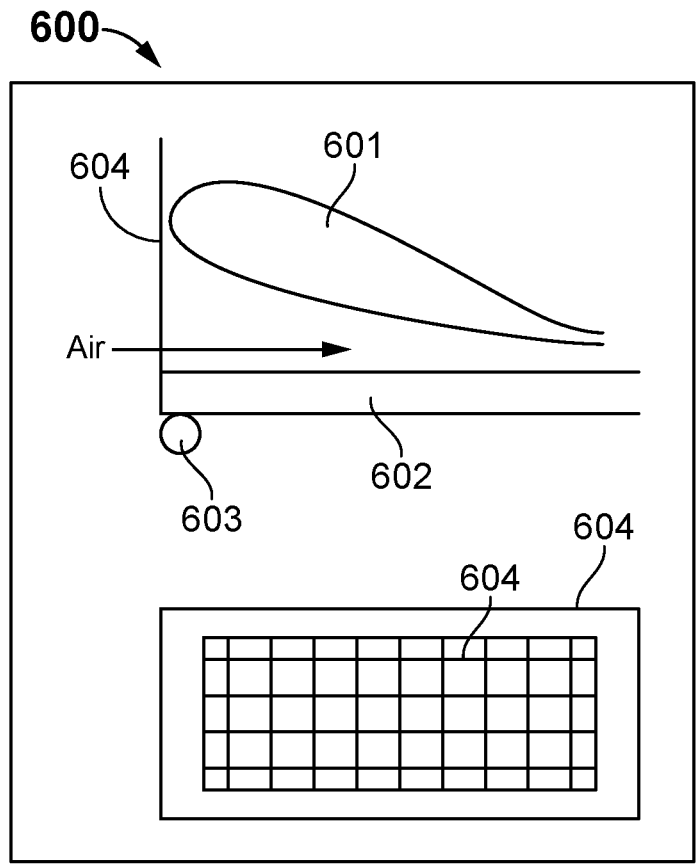
FIG. 6 is a side view depiction of a particular illustrative embodiment of the invention showing a membrane cover.

Turning now to FIG. 6, FIG. 6 is a side view of an illustrative embodiment of the invention a thin air permeable membrane cover 604 is positioned over an air scoop entrance or just inside of the air scoop entrance to prevent harmful materials passing through into the air scoop. An attachment clip 603 attached the air scoop top member 601 and bottom member 602 allowing air flow through the air scoop. A front view of the air scoop 604 is also depicted.

Figure 7:
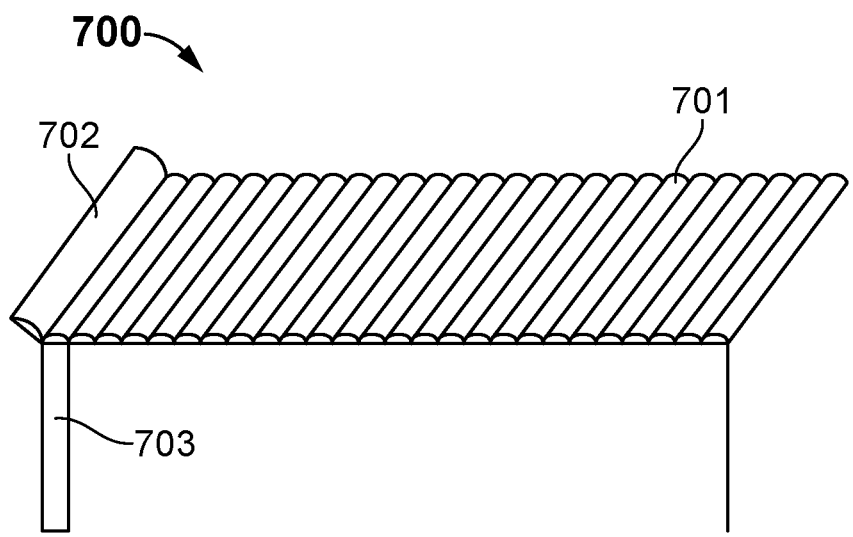
FIG. 7 is a side view depiction of a particular illustrative embodiment of the invention showing a windshield.

Turning now to FIG. 7, a top view of a wind shield having an air scoop to generator 702 mounted 703 on a truck. Roof mounted batteries are provided on top of the truck with a windshield 701 for each battery. In another illustrative embodiment of the invention a windshield covers an entire length of the roof mounted batteries front and side view of a dispensable battery is depicted. As show in FIG. 8, a honeycomb design 801 for the dispensable battery 802 allows optimal charge and prevents losing the entire battery as cells deteriorate. Preferably the dispensable battery is ¼ inch to 3 inches thick. The honeycomb design dispensable battery is preferably under 50 pounds. In another particular illustrative embodiment of the invention, the honeycomb design is based on energy needs, value of energy provided by the dispensable battery and frequency of need for removal. Preferably, the dispensable batteries are individually replaceable as needed.

Figure 9:
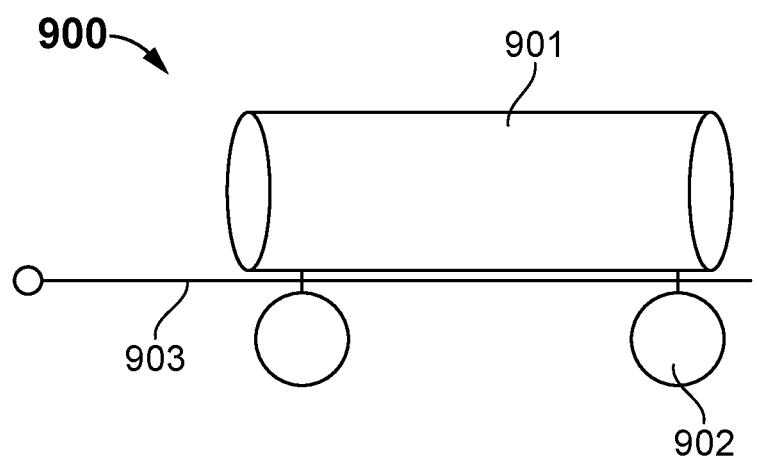
FIG. 9 is a side view depiction of a particular illustrative embodiment of the invention showing a Pressurized tank design (compatible with rail and long haul trucks) AND smaller wheeled trailer units.

Turning now to FIG. 9, a side view of a pressurized tank design for a particular illustrative embodiment of the invention is depicted. As shown in FIG. 9, a pressurized tank 901 is mounted on a platform 903 on wheels 902. The tank is sized according to needs. The pressurized tank can be the size of rail car and can be smaller similar to the size of portable LPG tanks. Some vehicles will wheel mount the pressurized tanks as shown in FIG. 9.

Figure 10:
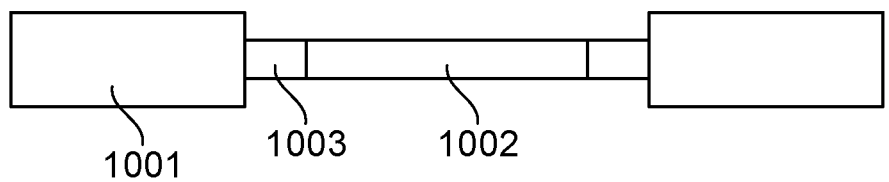
FIG. 10 is a side view depiction of a particular illustrative embodiment of the invention showing a tethering device (compressed air and power)

Turning now to FIG. 10, a side view of a tethering device in a particular illustrative embodiment of the invention is depicted. As shown in FIG. 10, two connection points 1000 and 1004 are provided. Connection point 1000 attaches to a source and connection point 1004 connects to a destination. Adaptors 1003 and 1002 are built to accommodate voltage, receptacles, air flow and pressure. A length of the tethering device is determined by need. Materials for the tethering device are determined by need, for example, copper wire, sheath pressure requirements.

Figure 11:
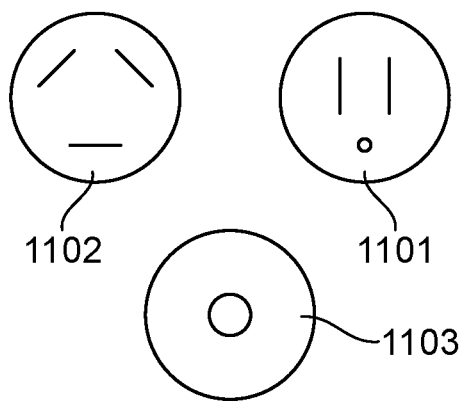
FIG. 11 is a side view depiction of a particular illustrative embodiment of the invention showing a wall plug receptacle.

Turning now to FIG. 11, a front view of three standard wall plug receptacles 1101, 1102 and 1103 are depicted as provided in a particular illustrative embodiment of the invention.

Figure 12:
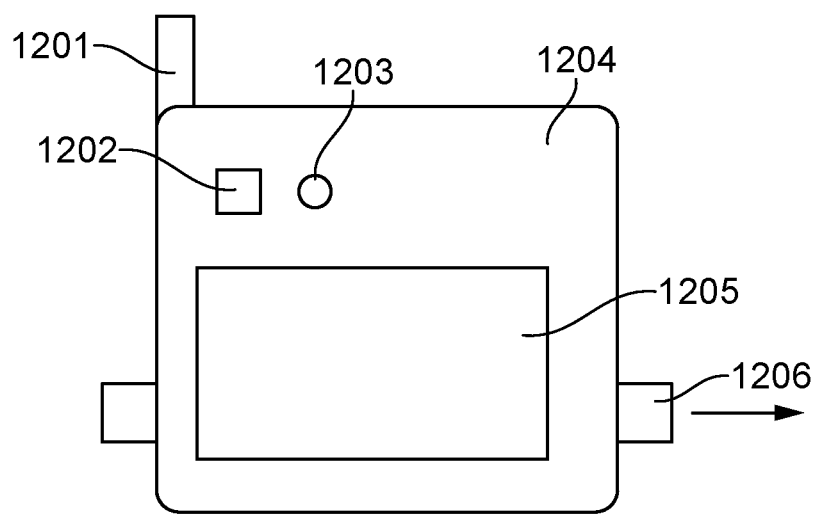
FIG. 12 is a side view depiction of a particular illustrative embodiment of the invention showing a commercial depot diagram.

Turning now to FIG. 12, a front view of a commercial depot design in a particular illustrative embodiment of the invention is depicted. As shown in FIG. 12, wireless capability 1201 is provided. A digital display 1202 is provided for capacity, pricing. Fire suppression equipment is provided to coat the batteries in case of emergency. An outflow device 1206 is connected to a tethering device. A tethering device 1203 to fill rack is provided as an option. A door 1205 is provided to shield batteries deposited with an internal rack system shown in FIG. 13.

Figure 13:
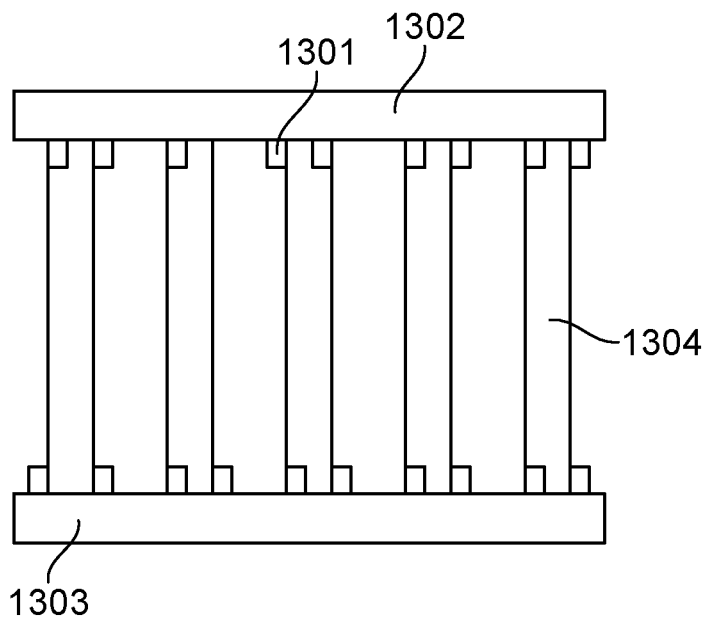
FIG. 13 is a side view depiction of a particular illustrative embodiment of the invention showing a battery rack.

Turning now IG. 13, in a particular e embodiment of the invention, a battery rack 1304) is provided. As shown in FIG. 13, a single or multiple batteries are stored in the rack system 1300. A lock mechanism 1301 is provided at a top 1302 and) m 1030 battery rack member to lock the batteries 1304 into the battery rack. The rack slides out of the storage in the commercial depot design shown in FIG. 1.2 for easy deposit and removal. The system will signal charged and uncharged batteries. A capacity size for the batteries varies depending on the final design and fit into a commercial tank space.

Figure 14:
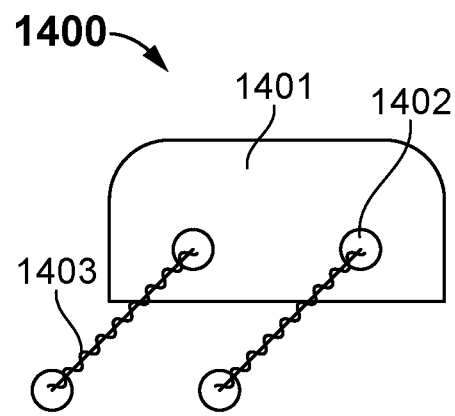
FIG. 14 is a side view depiction of a particular illustrative embodiment of the invention showing a mounting bracket.

Turning now to FIG. 14 a non-hinged mounting bracket 1401 is provided to secure the batteries to a vehicle depending on air speed and need for removal replacement.

Figure 15:
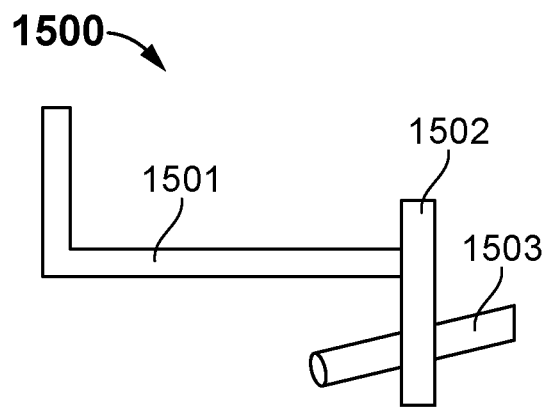
FIG. 15 is a side view depiction of a particular illustrative embodiment of the invention showing a mounting bracket.

Turning now to FIG. 15, a screw-in hinged bracket is provided for removable batteries. The hinged and non-hinged mounting brackets are engineered to manage eight and force are integrated into the windshield as needed.

"Air scoop" designs to pull wind into a tunnel for energy capture. If the desired energy capture is to be in the form of power, then a conversion to power by having a set of blades on a hub (similar to existing jet engine turbine blades) or spindle with fins (both being named an "energy converter spine") spin to create electricity through an interface with a power generator (i.e. an armature with one or more coils passing by magnets). The entire unit shall be called the "wind energy to power conversion unit". We envision flush mounts to the body of the vehicle for the wind energy to power conversion unit. Since in this case power is to be created from wind energy, then the air scoop shall have an opening on the back side of the air scoop to allow the funneled air to be released after it goes through the wind energy to power conversion unit. We also envision more prominent designs that will be built into the vehicles as a more pronounced feature of the vehicle that are aesthetically acceptable and meet any restrictions of use along the transportation path (e.g. overpass heights or lane widths) to the buyer. The wind energy to power conversion unit, we envision will be sold both as retrofits for existing vehicles but also integrated into new vehicle designs. The components of the wind energy to power conversion unit need to be designed to be extremely aerodynamic to reduce overall vehicle drag but also allow for very high rates of capture of air movement and conversion to energy. The materials used to capture the air movement must be sturdy enough to handle the anticipated windspeeds of the vehicle they are attached to and will require adequate gearing to allow mechanical parts to move within tolerances and/or to disengage as required to allow wind energy to pass through largely unimpeded to avoid damage to fully charged energy cells. In most instances, we anticipate high strength plastics, fiberglass, and metals (including but not limited to stainless steel, titanium, and copper) to be used. In addition, the components must be weather and corrosion resistant/proof, again depending on applications. A ship or barge on the ocean with significant saltwater exposure will need to have materials used that are corrosion resistant/proof.

Air scoops on all vehicles need to have a portal included to allow any water that gets into the system to be evacuated. If the energy to be captured from the funneled air coming through the air scoop is to be turned into compressed air in a tank, then a "valve system" that allows for funneled air to be captured and put into an energy cell (i.e. pressurized tank) shall be deployed. Such an air scoop design must allow for residual air to be bled through based on the capacity of any tank and the valve capture system deployed. The entirety of such a system shall be called a "wind energy to compressed air unit".

FIG. 5 is a side view depiction of a particular illustrative embodiment of the invention showing an energy converter spine, Energy Converter Spine (sample of 2 designs). Gearing designs (to be completed and inserted as drafted by engineer) Valve designs (to be completed and inserted as drafted by engineer) Generator (power) (to be completed and inserted as drafted by engineer)

FIG. 6 is a side view depiction of a particular illustrative embodiment of the invention showing a membrane cover.

FIG. 7 is a side view depiction of a particular illustrative embodiment of the invention showing a windshield.

In either energy capture system, it is envisioned the opening to the air scoop will be able to take advantage of a "membrane", semi-permeable material that will allow the passage of adequate air movement into the air scoop but shield any internal devices from loose particles and some moisture. Finally, the planned design of both units shall allow for relatively easy repair, so access points with sufficient spacing to manipulate unit components and the use of modular units is anticipated.

Figure 8:
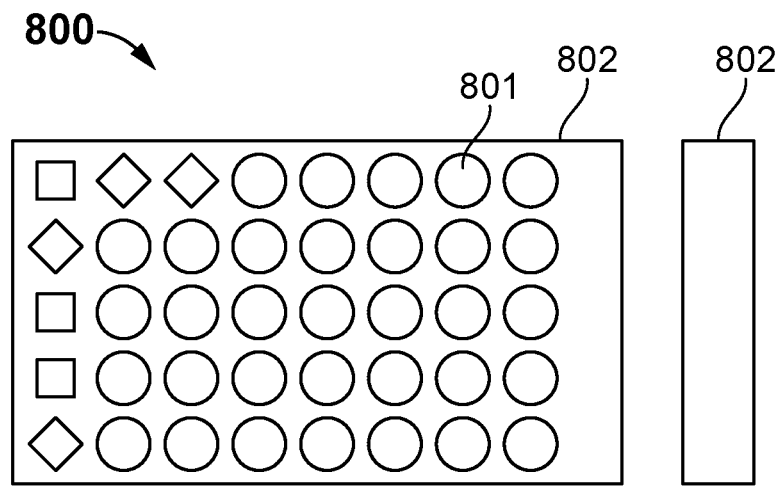
FIG. 8 is a side view depiction of a particular illustrative embodiment of the invention showing a dispensable battery design (honeycombed cells and thin HVAC style design)

FIG. 8 is a side view depiction of a particular illustrative embodiment of the invention showing a dispensable battery design (honeycombed cells and thin HVAC style design)

"Energy cell" designs specifically for power storage are largely expected to be flat and honey combed with multiple cells available to capture electricity. Some will be designed to be the size of air filters for HVAC systems with a target weight of less than 40 lbs. and be used individually or in integrated sets of multiple energy cells. Such energy cells shall be "dispensable batteries" with multiple applications on board a vehicle or for remote use. As an example, on a long haul truck with flat energy cell panels on the sides of the cargo carrier, the energy cell panels may be removed and placed into a "commercial depot" gathering system as desired (likely at a traditional hydrocarbon fueling depot). Others will be built to be larger and will require the use of machinery to remove (e.g. those implanted on ship or barge decks). All energy cells will have sensors attached to notify the possessor of the energy cell to know the basic capacity and flow rate of such energy cell, how much energy is currently retained in the energy cell, and its current efficiency for capturing and dispensing such energy (a "bad energy cell sensor").

The energy cell designs will allow for energy extraction either directly from the vehicle as attached energy cell units via a "tethering device" OR via a removal and replacement of the energy cell units. The concept of rapid removal from a vehicle will require a "mounting bracket" that is easy to operate but secure to avoid accidental drops. One example could be designed specifically for honeycombed energy cells to be lifted off a car or truck.

FIG. 9 is a side view depiction of a particular illustrative embodiment of the invention showing a pressurized tank design (compatible with rail and long haul trucks) AND smaller wheeled trailer units.

Another example is a rail car pressurized tank system that can be taken from its rail specific wheel and suspension system and set on a truck platform for travel to a more remote destination. More permanent energy cell mounts will also require a secure mounting bracket.

Depending on the final mounting configuration, "windshields" that allow air to easily pass over installed energy cells, valves, gears, and generators may be required to protect these items from environmental elements and to reduce wind drag. These "windshields" are expected to have a front edge facing the anticipated air flow that attach the leading edge of this drag reduction device flat to the body of the vehicle, potentially integrate into the air scoop design, and then rise to the height of the protected items and actually cover the outside exposed edge of these installed items with a smooth surface. The strength of such windshield is expected to be strong enough to prevent penetration of elemental items from piercing the shield if serving as an external shell. Metal, fiberglass, and plastic molding are potentially the materials to be used for the windshield. In addition, additional materials may be inserted between the wind shield and the installed items to serve as insulation, buffer sound, and possibly to retard fire risk. These shells may be constructed with images facing the outside environment of the vehicle to provide a source of additional advertising value. In some instances, like with a semi-trailer it shall be possible to mount energy cells inside the existing metal shell of the carrier and use the carrier's existing protective siding.

FIG. 10 is a side view depiction of a particular illustrative embodiment of the invention showing a tethering device (compressed air and power).

Tethering devices will be designed to fit into a single point (or at least limited number of points) of the energy cell unit(s) so that power or compressed air may be dispensed with minimal loss. If the tethering unit is to be used to transfer electricity from energy cells that are rigidly attached to a vehicle, then the design of the energy cells and the tethering device shall be designed and built to allow for the most rapid (but safe) dispensing of electricity from the vehicle energy cell(s) to the secondary destination.

FIG. 11 is a side view depiction of a particular illustrative embodiment of the invention showing a wall plug receptacle.

The secondary destination may be a "wall plug receptacle" in a house or commercial location for local use or dispensing hack into the grid OR "commercial depot" for later distribution to alternative users. The wall plug receptacles will be designed to safely receive power dispensing from vehicles when not in motion.

FIG. 12 is a side view depiction of a particular illustrative embodiment of the invention showing a commercial depot diagram.

Commercial depots may be simple electric charging stations with direct tie into the power grid or into an energy cell storage unit for a secondary delivery to another user (e.g. another vehicle). Commercial depots shall be designed in various forms including features such as: (i) they may be chargeable by either the existing power grid or from vehicles that stop by to dispense their stored power to them or (ii) may receive dispensable batteries. In addition, they will be designed to offer a range of secondary dispensing capabilities either by direct tie into the grid, tethering to additional devices, loads, or batteries, OR via dispensable batteries being picked up by other users. When focused on offering dispensable batteries, a commercial depot shall be designed for collection and use similar to a residential propane tank dispensing unit.

The dispensable batteries will be filled with power (from either vehicles or from the grid) and available for pick up to be carried to destination markets.

FIG. 13 is a side view depiction of a particular illustrative embodiment of the invention showing a battery rack.

The "battery rack" storing dispensable batteries must be safely designed and likely with fire suppression capabilities. Further, the dispensable batteries are expected to have a storage rack that shall allow for continuous charging (trickle or rapid) to keep the batteries topped off with energy content. The battery rack will have electronics that measure energy cell fill.

Similarly, compressed air tanks if small in design may be dispensed from commercial depots. Each tank will be designed to take on additional air to top it off and come with technology to detect the amount of stored energy in the tank. It is anticipated these tanks may be larger and come with a wheeled trailer. The picking up and dropping off of such units may be similar to distribution points for larger rental vehicles or propane tanks.

Commercial depots will have a range of "electronic hardware devices" attached to continuously measure energy content, temperatures, energy transfers in or out of the depot via tethering OR via a drop off or pick up of a dispensable energy cell or compressed air tank, % of fill capacity and potential fill rates, circuits to allow charging or dispensing of electricity as required, valves to allow the filling or dispensing of compressed air as required, computers to calculate the value of energy collected or dispensed, wired and wireless capabilities to generate invoices and communication network capabilities to automatically dispense money to accounts receiving energy (whether tethered or in energy cell transfers) in or out of the commercial depot.

FIG. 14 is a side view depiction of a particular illustrative embodiment of the invention showing a mounting bracket;

FIG. 15 is a side view depiction of a particular illustrative embodiment of the invention showing a mounting bracket.

FIG. 16 is a data flow diagram of a particular illustrative embodiment of the invention showing software design components. As shown in FIG. 16, data flows from a vehicle or commercial dept 1601 in data packets to systems 1602. The systems provide feedback to the banks, vehicle, commercial depot, residence, and handheld displays.

In a particular illustrative embodiment of the invention the system includes but is not limited to Software design components; Wireless antenna/modem to send required data packs; Ability to receive digital inputs for (partial list); Price; Volume; Weight; Locking into bracket appropriately; ID of battery; ID of seller/buyer of energy; User friendly interface; Ability to get info to bank; accounts; Ability to get info to accounting systems; Ability to get info to vehicle/end users/safety system and controls "Software" shall be created to facilitate the use of dispensable batteries and compressed air tanks, commercial depots, and vehicular motion energy cells. This software shall help a user locate commercial points for receiving or dispensing energy, identify potential flow rate compatibility, and receive energy price information so that energy dispersion or collection can be optimized to capture the maximum value for the user of such technology.

In some instances, it should be noted as vehicles expand their use of battery technology as a primary and even supplemental power source for locomotion, this planned system for energy capture and power generation from air movement shall be integrated into those fuel systems for such vehicles. This energy capture system can be wired into the vehicle's existing battery system to feed it required power to expand the range and use of such vehicles. In such instances, the primary components of this invention that may be used in such an application will be the air scoop, energy converter spine, the gearing, generator, wiring harness, wind shields, tethering device, and various hardware and software systems to optimize energy flows to and around the vehicle and potentially to external sources (e.g. commercial depots and wall plug receptacles).

The need for a secondary energy cell may prove redundant or not required.

Finally, vehicular motion systems shall be engineered to compliment any other forms of energy capture that can come from vehicles such as any power generation that could be harnessed from wheel motion, exhaust capture, and/or sunshine hitting exposed solar panels.

While currently those forms of energy capture are largely envisioned to be uneconomic, in concert with the use of perpetual vehicular motion energy that comes from capturing wind energy, it is anticipated that a more efficient and comprehensive energy capture system may occur with the integration of all forms of energy capture.

In a particular illustrative embodiment of the invention an energy capturing and distribution system is disclosed including but not limited to an air scoop with a power turbine and/or compressor; wiring, gearing, and tubing design to move captured energy safely to storage and allows other energy inflows from various on vehicle or vessel sources; a battery cell or compressed air configuration for energy storage; battery housing for direct or later energy usage which affords protection during transportation; tethering device for battery to battery or battery to power receptacle which may be bi-directional but with emphasis for rapid discharge; battery cell depots tied into payment transfer systems; battery cells that can receive signals of optimal pricing to promote highest value discharge of stored energy into power grids.

In another particular illustrative embodiment of the invention a software and hardware system is disclosed including but not limited to an electric device that captures the export of information from a series of mechanical devices that measure stored energy; wireless connectivity; an ability to tie in market pricing for each unit of energy; an ability to tie in safe and secure payment information; an optimization software program that can determine the most optimal times for energy discharge and sale; a graphical interface that allows the parties to the energy transfers from such stored energy to efficiently make decisions and see their activity.

The invention claimed is:

1. An energy storage and distribution system comprising:
an energy depot configured to store energy;
an input port on the energy depot configured to transfer energy from an energy source and store the energy in the energy depot; and
an output port on the energy depot configured to transfer the energy stored in the energy depot;
a portable energy storage cell in the energy depot configured to transfer the energy from the energy depot into the portable energy storage cell in the energy depot;
a generator on a vehicle configured to produce electrical energy from a wind energy, wherein the electrical energy produced from the wind energy is stored in the storage cell;
wherein a wind energy capturing device mounted on the vehicle and configured to capture air when the vehicle is in motion, wherein the wind energy capture device is an air scoop;
an entrance on the air scoop configured to capture air flowing around the vehicle, wherein the air scoop is aerodynamically designed to reduce drag; and
an air permeable membrane covering the entrance of the air scoop configured to filtering moisture and loose particles from the air flow.

2. An energy storage and distribution system comprising:
an energy depot configured to store energy;
an input port on the energy depot configured to transfer energy from an energy source and store the energy in the energy depot; and
an output port on the energy depot configured to transfer the energy stored in the energy depot;
a processor in the energy depot;
a non-transitory computer readable medium connected to the processor;
a computer program stored in the computer readable medium, wherein the computer program comprises instructions executed by the processor, the computer program further comprising instructions to capture information from a series of devices configured to measure stored energy;
instructions to connect the devices using an antenna and modem for wireless capability that transfers the information between the devices;
instructions to correlate market pricing for each unit of measured stored energy;
instructions to correlate payment information for the measured stored energy;
instructions to determine optimal times for stored energy discharge and sale of the measured stored energy from the depot;
instructions to provide a graphical interface that allows parties to the energy transfers from such stored energy to efficiently make decisions and see their activity.

3. An energy storage and distribution system comprising:
an energy depot configured to store energy;
an input port on the energy depot configured to transfer energy from an energy source and store the energy in the energy depot; and
an output port on the energy depot configured to transfer the energy stored in the energy depot;
a portable energy storage cell in the energy depot configured to transfer the energy from the energy depot into the portable energy storage cell in the energy depot;
a tethering device attached to the portable energy storage cell configured to rapidly discharge energy from the portable energy storage cell; and
battery cells, wherein the portable energy storage cell comprises the battery cells in the energy depot configured to store the battery cells;
a plurality of payment transfer systems tied into the battery cells;
a processor in the battery cell depot, wherein the battery cells are configured to receive signals from the processor of optimal pricing to promote highest value discharge of stored energy from the battery cells into power grids.

4. The energy storage and distribution system of claim 3, further comprising sensors attached to the battery to determine basic capacity and flow rate of energy from the battery and a quantity energy currently retained in the battery and a current efficiency of capturing and dispensing the energy.

5. An energy storage and distribution system comprising:
an energy depot configured to store energy;
an input port on the energy depot configured to transfer energy from an energy source and store the energy in the energy depot; and
an output port on the energy depot configured to transfer the energy stored in the energy depot;
a portable energy storage cell in the energy depot configured to transfer the energy from the energy depot into the portable energy storage cell in the energy depot;
a generator on a vehicle configured to produce electrical energy from the wind energy, wherein the electrical energy produced from the wind energy is stored in the storage cell;
wherein the wind energy capturing device is an air scoop mounted on the vehicle and configured to capture air when the vehicle is in motion; and
an entrance on the air scoop is configured to capture air flowing around the vehicle, wherein the air scoop is aerodynamically designed to reduce drag; and
a tethering device configured to transfer the energy from the energy storage cells attached to a vehicle.

6. An energy storage and distribution system comprising:
an energy depot configured to store energy;
an input port on the energy depot configured to transfer energy from an energy source and store the energy in the energy depot; and
an output port on the energy depot configured to transfer the energy stored in the energy depot;
a portable energy storage cell in the energy depot configured to transfer the energy from the energy depot into the portable energy storage cell in the energy depot,
wherein the stored energy is electrical energy and wherein the portable energy storage cell is a portable battery, and wherein the energy depot further comprises a battery rack for storing the portable batteries, wherein the portable batteries are configured as an integrated cell design that slide into the battery rack wherein the batteries are one quarter inch thick and slide into the battery rack.

7. The energy storage and distribution system of claim 6 wherein the portable batteries are an integrated cell design that allows for optimal charge and prevents losing an entire battery as individual cells in the integrated cell design portable battery deteriorate.

* * * * *